United States Patent
Breivik et al.

(10) Patent No.: US 10,437,204 B2
(45) Date of Patent: Oct. 8, 2019

(54) METHOD AND SYSTEM FOR DYNAMIC POSITIONING OF INSTRUMENTED CABLE TOWED IN WATER

(71) Applicant: Kongsberg Seatex AS, Trondheim (NO)

(72) Inventors: Morten Breivik, Trondheim (NO); Ola Erik Fjellstad, Trondheim (NO)

(73) Assignee: Kongsberg Seatex AS, Trondheim (NO)

( * ) Notice: Subject to any disclaimer, the term of this patent is extended or adjusted under 35 U.S.C. 154(b) by 490 days.

(21) Appl. No.: 15/318,167

(22) PCT Filed: Jul. 3, 2015

(86) PCT No.: PCT/NO2015/050124
§ 371 (c)(1),
(2) Date: Dec. 12, 2016

(87) PCT Pub. No.: WO2016/003292
PCT Pub. Date: Jan. 7, 2016

(65) Prior Publication Data
US 2017/0139383 A1 May 18, 2017

(30) Foreign Application Priority Data
Jul. 3, 2014 (NO) .................................. 20140853

(51) Int. Cl.
*G01V 1/38* (2006.01)
*G05B 13/04* (2006.01)
(Continued)

(52) U.S. Cl.
CPC ............ *G05B 13/048* (2013.01); *B63B 21/66* (2013.01); *G01V 1/3817* (2013.01);
(Continued)

(58) Field of Classification Search
CPC ..... B63B 21/66; B63B 2211/02; B63B 35/04; G01V 1/3817; G01V 1/3826; G01V 1/3835; G05B 13/048
See application file for complete search history.

(56) References Cited

U.S. PATENT DOCUMENTS 5,790,472 A 8/1998 Workman et al.
6,691,038 B2 * 2/2004 Zajac ................... G01V 1/3826
702/14
(Continued)

FOREIGN PATENT DOCUMENTS

AU 2003231620 A1 9/2003
GB 2424950 A 10/2006
(Continued)

OTHER PUBLICATIONS

International Search Report and Written Opinion dated Oct. 30, 2015 (PCT/NO2015/050124).

*Primary Examiner* — Abdelmoniem I Elamin
(74) *Attorney, Agent, or Firm* — Alix, Yale & Ristas, LLP

(57) ABSTRACT

A method and system for dynamic positioning (DP) of marine instrumented cables. By means of a model predictive adaptive controller the power control output of a nominal controller is compensated and therethrough one achieve a more rapid and precise controlling of the control devices and accordingly the instrumented cables.

17 Claims, 4 Drawing Sheets

US 10,437,204 B2
Page 2

(51) Int. Cl.
  *B63B 21/66* (2006.01)
  *B63B 35/04* (2006.01)
(52) U.S. Cl.
  CPC .......... *G01V 1/3826* (2013.01); *G01V 1/3835* (2013.01); *B63B 35/04* (2013.01); *B63B 2211/02* (2013.01)

(56) References Cited

U.S. PATENT DOCUMENTS

| | | | |
|---|---|---|---|
| 7,804,738 B2 * | 9/2010 | Storteig | G01V 1/3861 367/16 |
| 8,570,830 B2 * | 10/2013 | Storteig | G01V 1/3861 367/16 |
| 8,857,360 B2 | 10/2014 | Rinnan et al. | |
| 8,897,938 B2 | 11/2014 | Fjellstad et al. | |
| 9,075,162 B2 * | 7/2015 | Baardman | G01V 1/36 |
| 9,180,936 B2 | 11/2015 | Fjellstad et al. | |
| 2003/0208320 A1 * | 11/2003 | Zajac | G01V 1/3826 702/14 |
| 2007/0127312 A1 * | 6/2007 | Storteig | G01V 1/38 367/15 |
| 2007/0223307 A1 * | 9/2007 | Storteig | G01V 1/3861 367/16 |
| 2008/0008037 A1 * | 1/2008 | Welker | G01V 1/38 367/21 |
| 2008/0253225 A1 * | 10/2008 | Welker | G01V 1/3835 367/17 |
| 2009/0310439 A1 | 12/2009 | Hauan et al. | |
| 2010/0135112 A1 | 6/2010 | Robertsson | |
| 2011/0002193 A1 * | 1/2011 | Storteig | G01V 1/3861 367/16 |
| 2011/0149682 A1 * | 6/2011 | Martin | G01V 1/3835 367/19 |
| 2011/0176385 A1 * | 7/2011 | Lambert | G01V 1/364 367/24 |

FOREIGN PATENT DOCUMENTS

| | | |
|---|---|---|
| GB | 2426820 A | 12/2006 |
| WO | 02059650 A1 | 8/2002 |
| WO | 2010054186 A2 | 5/2010 |

* cited by examiner

METHOD AND SYSTEM FOR DYNAMIC POSITIONING OF INSTRUMENTED CABLE TOWED IN WATER

BACKGROUND

The disclosure is related to a method for dynamic positioning of instrumented cable towed in water and also related to a system for dynamic positioning of instrumented cable towed in water.

Especially, the present invention is related to a method and system for absolute and relative dynamic positioning (DP) of marine instrumented cables towed in parallel.

A seismic instrumented cable (streamer) is an elongate cable-like structure (often up to several thousands meters long), which comprises an array of hydrophone cables and associated with electric equipment along its length, and which is used in marine seismic surveying. In order to perform a 3D/4D marine seismic survey, a plurality of such instrumented cables is towed behind a seismic survey vessel. Acoustic signals are produced by that the seismic sources are directed down through the water and into the seabed beneath, where they are reflected from the various strata. The reflected signals are received by the hydrophone cables, and next digitized and processed to form a representation of the earth strata in the area being surveyed.

The instrumented cables are typically towed at a constant depth of about five to ten meters, in order to facilitate the removal of undesired "false" reflections from the water surface. In order to keep the instrumented cables at a constant depth, control devices known as "birds" are attached to each instrumented cable at intervals of 200 to 300 meters.

Low frequency depth variations and lateral motions are inevitable. The main reason for instrumented cable depth variations is long periodic waves and changes of salinity and thus buoyancy along the cable.

In general, the worst-case situation is when towing in the same direction as the swell. Instrumented cable lateral motions are mainly due to sea current components perpendicular to the towing direction. Relatively large deviations can also appear in areas with brackish water where river course flows into the sea, something which can result in water stratification with different density. In cases of both swell and crosscurrent affection, the risk of streamer entanglement is increased.

The instrumented cable tension decreases proportionally to the distance from the towing point. Therefore, low frequency instrumented cable lateral and vertical motions tend to have larger amplitudes closer to the tail. However, the forces acting perpendicularly to the instrumented cable are non-uniformly distributed over the instrumented cable length, and change over time as the towed array moves forward.

During a seismic survey, the instrumented cables are intended to remain in a straight line, parallel to each other, equally spaced and at the same depth. However, after deployment of the instrumented cables, it is typically necessary for the vessel to cruise in a straight line for at least three instrumented cable lengths before the instrumented cable distribution is approximately close the ideal arrangement and the survey can begin. This increases the time it takes to perform the survey, and therefore increases the costs of the survey. However, because of sea currents, the instrumented cables fail to accurately follow the path of the seismic survey vessel, and sometimes deviating from this path at an angle, known as the feathering angle. This can negatively affect the covering of the survey, frequently requiring that certain parts of the survey must be repeated. In extremely unfortunate circumstances, the instrumented cables can become entangled in each other, especially at the tail of the instrumented cables, something which can cause great damages and considerable financial loss.

U.S. Pat. No. 5,790,472 (Workman and Chambers) describes a closed-loop system for controlling lateral position of seismic cables relative to their respective adjacent cables. The method is based on measured positions along the cables. If two cables come too close to each other, the control devices along the cables are commanded to set up a lateral force such that the distance between the cables is increased again. In the literature, this is known as bang-bang control strategy.

U.S. Pat. No. 6,691,038 (Zajac) describes a closed-loop system for controlling lateral position of seismic cables, either relative to their respective adjacent cables or more generally in relation to a specific reference geometry for the entire cable-spread. The controller uses continuous measurements of cable positions along the entire length and calculates desired lateral force for each control device on the cables. In addition to position measurements, used is a separate process for prediction of the behavior of the cable-spread based on data from environments and dynamics of the towing vessel. The predictions are used for calculating optimal reference curve for the total cable-spread. This is a high-level guidance functionality which must not be confused with adaptive real-time controlling.

NO 332563 (Rinnan et. al.) describes a closed-loop system for controlling lateral positioning of seismic cables where the wings of the control devices are provided with acoustic receiver and transmitter elements for measuring distance/position relative control devices on the adjacent cables. Controlling lateral position can thus be performed either locally on the control devices or globally on the towing vessel based on a telemetric model of the positions of the control devices in the seismic array. A robust controller in the control devices ensures minimal connection between the different control loops for lateral and vertical force and roll moment, respectively. Achieved is thus increased stability of the control devices, and robustness in relation to fault situations where separate wings stop to function.

A problem with the above mentioned inventions is that they either do not use a prediction model as basis for adjustment of power control output for the control devices, or that the prediction model being used is not updated as a function of varying operational conditions or external disturbances. The control system is thus not optimal with regard to response time, and is not robust in relation to unexpected incidents changing dynamics of the total system.

SUMMARY

The disclosed embodiments provide a method and system which entirely or partly reduce the above-mentioned disadvantages with prior art.

Also provided is a method and system which allow a more rapid position response at controlling of a marine instrumented cable-spread at varying disturbances from the environments.

The disclosed method and system provide a more stabile, robust, and precise and energy effective position controlling by that prediction error is used for adjusting power control output from the control devices along the seismic cables.

The disclosed method and system can also contribute to suppressing negative affections of the positioning from un-modelled dynamics and insecurities in the model parameters.

The disclosed method and system also provide for improving survey of grounds beneath seabed at marine seismic operations.

A system for positioning an instrumented cable towed in water, such as a marine seismic streamer, and/or a towed instrumented cable-array (streamer-array), typically includes several control devices arranged to the instrumented cables, a control central arranged onboard a vessel, preferably a survey vessel, which control central is arranged for communication with the instrumented cables and the separate control devices arranged thereto. This is often referred to as a STAP-system (STAP—"Seismic Towed Array Positioning"). The known systems further usually include tail buoys arranged to the instrumented cables in the cable-array, and deflector devices (doors) for spreading the instrumented cables in a cable-array. The control central is arranged for communication with control devices and tail buoys, either via the instrumented cable or wireless, and arranged for communication with the vessel and possibly deflector devices. Tail buoys can be replaced with control devices if they are provided with a GNSS unit (GNSS—Global Navigation Satellite System).

The control devices arranged to the instrumented cables are preferably a control device including:
- a main body provided with a processor unit, accelerometers, possibly rate gyro and magnet compass, and inductive connections for wireless (contactless) communication and energy transfer to wings or mechanical connections for communication and energy transfer,
- detachable wings, preferably at least two detachable wings, said wings being provided with a processor unit, inductive connection or mechanical connection for connection to the main body, Hall effect sensor, rechargeable batteries, intelligent charging electronics, motor with moment sensor,
- local control device software executing on the processor unit of the main body,
- local wing control software executing on the processor unit of the wing,
- sensors for different purposes, such as e.g. depth, temperature, salinity, magnetic field and motion, and possibly acoustic transmitters and receivers arranged in the wing.

Control devices as these are e.g. described in Norwegian patents NO 328856, NO 329190 and NO 332115 in the name of the applicant.

The above-mentioned wings can in addition to the mentioned sensors be provided with sensors for underwater transmission, magnetometer, pressure sensors, GNSS antenna and receiver, camera with light source, and other sensors for surveying characteristic properties of the sea and seabed.

The disclosed embodiments improve over known system in that the system and method provide absolute and relative dynamic positioning (DP) of marine instrumented cables towed in parallel. In addition, the system and method open for improved path controlling and/or autopilot in connection with positioning of instrumented cables. The method and system is based on a new model predictive adaptive controller for control devices arranged along the instrumented cables.

The method and system further include the use of a nominal controller for each control device controlling the marine instrumented cable based on previous knowledge about properties of the total system consisting of craft/vessel with propulsion means/control means, such as thrusters, propellers, etc., instrumented cables and control devices. With previous knowledge is meant a dynamic model of separate components of the system, and the interaction between them. The adaptive controller for each control device is arranged for compensating power control output from the nominal controller with the purpose of counteracting the effects of un-modelled dynamics, insecurity in model parameters, and varying external disturbances from e.g. weather (wind, current, waves, ice) and operational equipment. The adaptive controller can also contribute in estimating unmeasured variables which are to be used in the controlling, and contributing to changing the reference signal if necessary to achieve an improved total controlling of the instrumented cables and cable-array.

The method and system disclosed herein further include the use of a predictor for real-time simulation and prediction of the behavior of the total system by using a dynamic prediction model of the total system, by the use of a dynamic prediction model of the total system, and knowledge about power control output from the propulsion means/control means of the towing vessel and possibly also the operational equipment. The prediction model represents the dynamics in the total system consisting of craft/vessel with propulsion means/control means, instrumented cables and control devices, and is continuously updated. The deviation between predicated motion estimate and the actual motion measurements is used for both continuously adjusting power control output from the control devices along the instrumented cables, and for updating the prediction model. The motion measurements can include relative position measurements between nodes based on acoustics, absolute position/velocity measurements of nodes based on GNSS, and measurement of angular velocities and orientation of nodes based on inertial sensors and magnetometer. With nodes are meant all components in the system which are used for range measurements and relative and absolute positioning, e.g. towing craft, control devices, tail buoys, and possibly sensors for this arranged in the instrumented cables, on deflector devices or platforms for seismic sources ("gun-array").

The disclosed embodiments differ from prior art by the use of an adaptive estimate for the control devices for counteracting the effects of un-modelled dynamics, insecurity in model parameters, and varying external disturbances. In contrast to other adaptive algorithms, which try to estimate all the individual components of these insecurity factors, here are used only one variable for estimating the sum of the insecurity factors. The adaptive estimate is further based on prediction error instead of control error (error between reference and measurement), as the most traditional adaptive algorithms work. It is thus achieved a more rapid response for all changes affecting the force balance of the dynamic system, both internally and externally, and one avoids jumps in control elements at sudden changes in reference signals for the instrumented cables. Continuous updating of the prediction model ensures that it best possible reflects the dynamics of the total system at any time.

The method and system are, in other words, based on an adaptive algorithm called model predictive adaptive control, MPAC.

The main motivation for the development of the disclosed embodiments was to find a replacement for the integral action in PID controllers, which are often used for calculating lateral and/or vertical force in control devices as described above, for that the control device and the instrumented cable shall achieve the desired position references. This integral action has considerable limitations in performance due to it is driven by the control error, i.e. the difference between a reference signal and the actual behavior of the system.

The control error consists of two main components: 1) a stationary component corresponding to the error in stationary state and 2) a transient component corresponding to the error arising by changes in the reference signal. Ideally, it is desirable to only integrate on the stationary component of the control error, as it is this which gives information about unknown effects affecting the system. Integration of the transient component is not desirable due it can result in overshoot or instability, something which is a considerable problem with PID control. However, it is not possible to separate the stationary component from the transient component when both these components are present. It will thus be a possible solution to postpone the integration until the stationary state has occurred, but this requires a reliable stationary state detector, and will also prevent that the controller already in the transient phase can learn about the unknown effects affecting the system.

For a model-based controller the stationary control error will correspond to the modelling error, which is the difference between the behavior of the real system and the behavior of the model which has been used to design the controller. If this difference had been zero, accordingly without model insecurity, the stationary control error would also have been zero. One of the main concepts with the disclosed embodiments is thus to calculate a prediction of the system behavior based on a model of the total system, and using the difference between the actual and predicted system behavior—the prediction error—to drive the integral action. The integration will thus only be based on information being relevant for estimating system insecurities, and the integration can thus be performed continuously, also in the transient phase, without contributing to overshooting or instabilities.

Such a concept could also have been called model-based, prediction-based or simulator-based integration. However, the term model predictive adaptive control was regarded as more covering and describing, especially for differing MPAC from the most used adaptive solution today, which is model reference adaptive control, MRAC. In the same manner as for the integral action of the PID controller, the adaptive estimates of the majority of the MRAC solutions are driven by the control error.

In the following the main concepts behind MPAC will be illustrated by a simple 1-dimensional mass damper (MD) system. MD dynamics can represent the behavior of many physical systems. A 1-dimensional MD system corresponds typically to one degree of freedom, DOF without spring forces, e.g. surge or yaw degree of freedom of a mechanical system as an aircraft or a ship. The MD system is thus considered as:

$$\dot{x}=v \quad (1)$$

$$m^*\dot{v}+d(v)^*v=\tau^*+w^*, \quad (2)$$

where $x \in \mathbb{R}$ represents the position, $v \in \mathbb{R}$ represents the velocity and $\dot{v}=a \in \mathbb{R}$ represents the system acceleration. In addition $m^*>0$ represents the actual mass parameter, $d(v)^*>0$ the actual nonlinear damping parameter, $\tau^* \in \mathbb{R}$ the actual controller output, while $w^* \in \mathbb{R}$ represents the actual disturbances from the environment.

The aim of the controlling is to get the MD system to follow the motion of a reference target with motion variables $x_r \in \mathbb{R}$, $v_r \in \mathbb{R}$ and $a_r = \dot{v}_r \in \mathbb{R}$. The reference motion is typically specified of a human user/operator or a technical reference generator. The control target is thus to achieve that both the position error $\bar{x} = x_r - x$ and velocity error $\bar{v} = v_r - v$ both go to zero. However, this target is difficult to achieve due to the insecurities related to $m^*$, $d(v)^*$, $\tau^*$ og $w^*$. Present controllers attempt to handle these insecurities by using integral action or by adaptive methods.

A model-based controller for the MD system given by the equations (1)-(2) is typically designed based on a mathematical model, which represents the best guess of how the system behaves. Such a model can be expressed as:

$$\dot{x}=v \quad (3)$$

$$m\dot{v}+d(v)v=\tau+w+\theta, \quad (4)$$

where the position x and velocity v are system states which are assumed measureable and known, but where m, d(v) and w only are estimates of the actual values and τ is the commanded controller output. In MPAC is therefore introduced the variable θ for representing all model insecurities and unknown disturbances, which in this case would be:

$$\theta=\Delta\tau+\Delta w-\Delta m\dot{v}-\Delta d(v)v, \quad (5)$$

where $\Delta\tau=\tau^*-\tau$, $\Delta m=m^*-m$ and $\Delta d(v)=d(v)^*-d(v)$. Accordingly, θ collects the sum of all the unknown terms in one single variable, such that the system model given by the equations (3)-(4) is identical with the real system given by the equations (1)-(2). This parameterizing is simple but unique, and constitutes a vital difference compared to the state of art adaptive algorithms. The parameterizing is very effective for being able to estimate the sum of all the insecurities in the system, and is similar to the way the PID controller integral action gets as task to counteract all the insecurities, something which it however only can achieve for insecurity effects being constant or slow-varying in relation to the control error dynamics. At the same time the MPAC parameterizing is clearly different from standard adaptive control methods, where the different insecurities are divided in specific categories which are to be estimated separately. For so-called indirect adaptive methods the categories are related to the system states, system parameters, controller output, disturbances, etc. For so-called direct adaptive methods the categories are related to the controller parameters. Traditional adaptive methods thus try to estimate several different effects at the same time, a method which is attended with system identification, where the target is to identify individual model components. However, MPAC focus by the θ parameterizing only on achieving the control target, by estimating and counteracting the total sum of the insecurities, and not by attempting to identify the individual components which constitute this sum. MPAC is thus a control focused adaptive method.

Based on the equations (3)-(4) the controller can be designed such that it is constituted of two parts, as:

$$\tau=\tau_n-\theta_p \quad (6)$$

where $\tau_n$ is a nominal controller based on the equations (3)-(4), and where $\theta_p$ is an adaptive estimate of θ. $\tau_n$ will typically be designed for achieving a specific closed-loop behavior for the nominal mathematic model of the system, which corresponds to θ=0 in equation (4). The role of $\theta_p$ is thus to predict and counteract the model insecurities represented by θ, such that the real system can achieve the closed-loop behavior corresponding to $\tau_n$. In this respect it is neither appropriate nor desirable that $\tau_n$ itself contains integral action. The nominal controller will thus consist of a model-based feed-forward, in this case based on equation (4), and feedback with proportional and derivative action (PD-type).

By using the controller given by equation (6) for the MD system in equation (4), the following closed-loop system is achieved:

$$m\dot{v}+d(v)v=\tau_n+w+\tilde{\theta}, \quad (7)$$

where $\tilde{\theta}=\theta-\theta_p$, and where the target of $\theta_p$ is to achieve that $\tilde{\theta}\to 0$, so that:

$$m\dot{v}+d(v)v=\tau_n+w. \quad (8)$$

The adaptive update rule for $\theta_p$ can e.g. be designed by using the Lyapunov function:

$$V_\theta = \frac{1}{2}\left(m\tilde{v}^2 + \frac{1}{\lambda}\tilde{\theta}\right), \quad (9)$$

where $\tilde{v}=v-v_p$ is a prediction error for the velocity, $v_p$ is a prediction of the measured velocity v, and $\lambda>0$ is an adaption gain. The resulting design gives two update rules, one for prediction and one for adaption. Concrete the so-called predictor system becomes:

$$\dot{v}_p = \frac{1}{m}(-d(v)v + \tau + w + \kappa\tilde{v} + \theta_p), \quad (10)$$

where $\kappa>0$ is an injection gain which contributes to stabilizing the dynamics of the prediction error and makes it possible to tune the rate as $\tilde{v}\to 0$. In addition, the adaptive update rule (adaption rule) becomes:

$$\dot{\theta}_p=\lambda\tilde{v}, \quad (11)$$

which is a pure integration of the prediction error $\tilde{v}$. This integral action differs thus considerably from the integral action in a PID controller due to the latter is a pure integration of the control error. Due to the integral action of MPAC does not depend on the control error it is possible to integrate continuously, independent if the closed-loop system is in stationary or transient phase. This means that the adaptive estimate given by equation (11) continuously can learn about insecurities of the system, and can be used in the controller without this resulting in overshooting or instabilities.

Reference is made to FIG. 3 which shows a principal drawing of a model predictive adaptive controller (MPAC). The figure illustrates how the model-based predictor system given by equation (10) co-operates with the integral action of the adaption rule given by equation (11).

The predictor system given by equation (10) imitates the actual MD dynamics given by equation (2) by using a combination of the MD model given by equation (4), the virtual feedback term $\kappa\tilde{v}$ and the adaptive estimate $\theta_p$. The virtual MPAC predictor adaptor system accordingly enables continuously and rapid estimation and counteraction of model insecurities.

The MPAC predictor given by equation (10) can also be rewritten in the form:

$$\dot{v}_p = \frac{1}{m}\left(-d(v)v + \tau + w + \kappa\tilde{v} + \lambda\int_0^t \tilde{v}(t)dt\right), \quad (12)$$

which shows that it consists of a model based feed-forward based on equation (4) and a feedback with proportional and integral action (PI-type) based on the prediction error. MPAC thus combines the observer principle represented by the proportional term $\kappa\tilde{v}$, with the adaption principle represented by the integral term $\lambda\int_0^t \tilde{v}(\sigma)d\sigma$. It should be noted that in general there are no demands that it must be present and used a model of the system, and the MPAC predictor will in such case only consist of a pure PI-type feedback based on the prediction error.

Due to the combined predictor adaptor system is a virtual dynamic system, where the dynamics is only limited by the implementation of the system in a processor unit, it can be adapted to any physical system which in comparison develops slower, i.e. such that $\dot{\theta}=0$ compared with $\dot{\theta}_p$. This means that the adaption rate of MPAC can be far higher than the adaption rate of a PID controller or a MRAC solution, due to the rate of the latter is limited by the control error, which again is dependent of the physical system dynamics. In practice, the adaption rate of MPAC will be limited with regard to measuring noise and dynamics of the system control elements.

This system can also be considered as an independent module which can be implemented in hardware, software or both. Such a module can be used for augmenting any nominal controller for being able to handle insecurities. In such a manner it is important to understand that the closed-loop behavior cannot be better than the one which is attended with the nominal controller, as the MPAC module only ensures compensation for model insecurities such that $\tilde{\theta}\to 0$.

It is also important to point out that the MPAC predictor adaptor can estimate $\theta$ correctly, independent if $\theta_p$ is used in the controller or not, something which is not possible with the PID controller or MRAC solutions, where the integral action must be in a closed-loop to achieve correct value. This property means that the adaptive estimate seamlessly can be connected in and disconnected from the control loop at need, and that it does not need a new running-in period after being disconnected for a time period. This also enables seamless switching between active and passive processor units, which is necessary if the active processor unit fails and one of the passive sensor units must take over the control responsibility. All these processor units can actually run the same type of MPAC predictor adaptor in parallel, independent if they are actively involved in the controlling or not.

In addition to estimating model insecurities the predication nature of MPAC also makes it possible to estimate unmeasured system variables. It can, for example, of different reasons be practically difficult to measure the velocity v of the MD system, which is required for implementing the predictor adaptor system given by the equations (10)-(11). In this case v can be estimated from the measurement of x, in the same way as $\theta$ can be estimated from the measurement of v. The method for designing this solution is identical with the one used for designing the equations (10)-(11). This means that the MPAC solution is equally suitable for estimating unmeasured system variables as estimating model insecurities; something which is possible due to MPAC combines the observer principle with the adaption principle, and thus has a double nature. In the same way MPAC can also estimate variables required by the reference generator to achieve the best possible controlling.

MPAC can thus be used in any type of control loops, both inner and outer loops, for providing a more precise, robust and energy effective controlling, estimation and controlling of a system. This is illustrated in FIG. 3 by that the adaption rule sends signals which both can be used by the reference generator and the nominal controller, in addition to direct use in the commanded controller output (6).

A summary of advantages by using prediction error instead of control error for driving the adaptive estimate is as follows:

Avoids integration of the undesired transient component of the control error in the transient phase. Such integration is as mentioned the main cause that PID controlling results in overshooting and instabilities at changes in the reference signal. In comparison, the prediction error only contains relevant information to integrate on.

Avoids the possibility for unlimited grow in the integral term as a result of the reference signal moving to fast in relation to the physical system, i.e. avoiding integration of a growing control error. Such grow cannot happen at integration of the prediction error as it does not contain the reference signal. The adaption is performed totally independent of the control error value.

Avoids complex implementation of functionality for a bumpless transfer when it is needed to switch from an active processor unit to another processor unit. Such transfer is required at the use of PID controllers for avoiding discontinuity in the controller output when the active processor unit fails. By integration of prediction error, both active and passive processor units will achieve the same adaptive estimate and it can thus be switched seamlessly between them.

Avoids the standard requirement for adaptive methods of matching conditions, which means that the controller output and model insecurities must be at the same level as the system model for being able to estimate the latter. By using the prediction error it is not relevant where the insecurities are in relation to the controller output. This property also points to the double observer adaption nature of a predictor adaptor system.

As regards adaptive control it is in general pointed on two fundamental challenges:

1. A desire to separate the time scale attended with the adaption from the time scale attended with the physical system. In short, adaptive systems are safer to use when the time scales are considerably separated.

2. A need for so-called persistent excitation, which means that correct estimation, is only possible when the signals driving the adaptive estimates contain sufficient varied information. If this condition is not satisfied, adaptive controller, which attempt to estimate several individual model components at the same time, will experience a temporary instability phenomena ("bursting") after a certain time period in the stationary phase. The reason for this is that the only information which can be learned from this phase is the measurement noise, something which can cause unexpected and instable controller behavior. The update of the adaptive estimates is therefore often turned off in the stationary phase.

MPAC solves both these challenges as follows:

1. Due to the predictor adaptor system is a virtual system; it is possible to achieve a considerable separation of the time scale of the adaption from the time scale of the physical system to be controlled. This separation is not possible with an adaptive estimate driven by the control error, due to the dynamics of this error is dependent of the dynamics of the physical system. MPAC, on the other hand, can have an adaption rate which is independent of the dynamics of the physical system.

2. By using only one adaptive estimate, which represents the sum of the insecurities, achieved is automatically the requirement of persistent excitation. The danger for temporary instability in the stationary phase is thus avoided. The adaption can thus be performed continuously and independent if the closed-loop system is in a stationary or transient phase.

Accordingly, MPAC can adapt faster than both the integral action of the PID controller and the MRAC adaptive estimates. At the same time, MPAC can adapt continuously and uninterrupted, in contradiction to the integral action of the PID controller which should be turned off in the transient phase, or in contradiction to the MRAC adaptive estimates which should be turned off in the stationary phase.

In practice, an adaptive controller attempts to join identification and controlling, which in basis are two contradictory targets:

Identification requires persistent excitation, which will be in conflict with the control target.

Controlling typically does not use online identification, something which will result in lower performance if the system dynamics change on the way.

It is thus a need for a "control focused adaption", i.e. adapting for achieving the control target, in contradiction to "identification focused adaption", i.e. adapting for identifying parameters of the system. MPAC represents such a type of "control focused adaption" with focus on the control target.

By using MPAC in applications like dynamic positioning of instrumented cables one should make the following practical considerations:

Suitable initialization of dynamic states of the predictor adaptor system.

One should further know as much as possible about the total system for positioning of the instrumented cables, so that information about the structure and parameters of the system dynamics, dynamics of the control elements and the possible disturbances form the basis for design of the nominal controller, as adaptive systems never can compensate for a basis lack of system information. Such information eliminates unknown factors which otherwise could prove to make system operation impossible.

It is further a presumption to identify the most important time scales attended with the control problem, and next choose controller, prediction and adaption gains correspondingly. In the simplified MD example the most important time scales belong to the physical system and the predictor adaptor system. In the real world the time scale of the dynamics of the control elements will also be very important. There are these which physically shall implement the commands from the controller, and they are typically considerably faster than the dynamic system which is to be controlled.

It is further important to avoid that measuring noise affects the physical system through the control elements, something which can be achieved by controlling the rate which the adaptive estimate is let into the control loop on, e.g. by using filtering. This rate must correspond to that which is physically possible with the actuators and at the same time avoid unnecessary wear and tear.

Short summarized the fundamental aspects of MPAC are as follows:

1. The specific parameterizing of the adaptive control problem, exemplified by equation (2) and (4).

2. All model insecurities are collected in one single variable to be estimated.

3. The adaptive estimate is driven by the prediction error and not by the control error.

4. The dynamics of the prediction error is stabilized by virtual feedback in the predictor.

5. The predictor uses the commanded and not the measured controller output.

6. If available, the predictor will use a nominal mathematic model of the system which is to be controlled, but such a model is not required.

It is the combination of these aspects which provides the unique properties of MPAC. The example with the MD system shows the MPAC concept in its simplest and most basic form, but the concept applies generally and can be applied for arbitrary large and complex systems.

The disclosed embodiments achieve by MPAC a novel adaptive controller solution which is motivated by the disadvantages of the integral action of the PID controller. MPAC represents a more complex method than standard PID, but solves at the same time two fundamental challenges with adaptive controlling. Compared with PID and standard adaptive controllers as MRAC, MPAC can adapt continuously, uninterrupted and at the same time faster, without the same kind of risk for instabilities in closed-loop. The role of MPAC is to help the nominal controller with elimination of the insecurities of total system, and providing robustness if unknown incidents happen on the way.

This way to solve dynamic positioning of instrumented cables will have considerable advantages as the instrumented cables are affected by the nature, which not in an easy way can be measured.

Further preferable features and details of the disclosed embodiments will appear from the following detailed description.

BRIEF DESCRIPTION OF THE DRAWINGS

The present invention will below be described in more detail with reference to the attached drawings, where.

DETAILED DESCRIPTION

Figure 1:
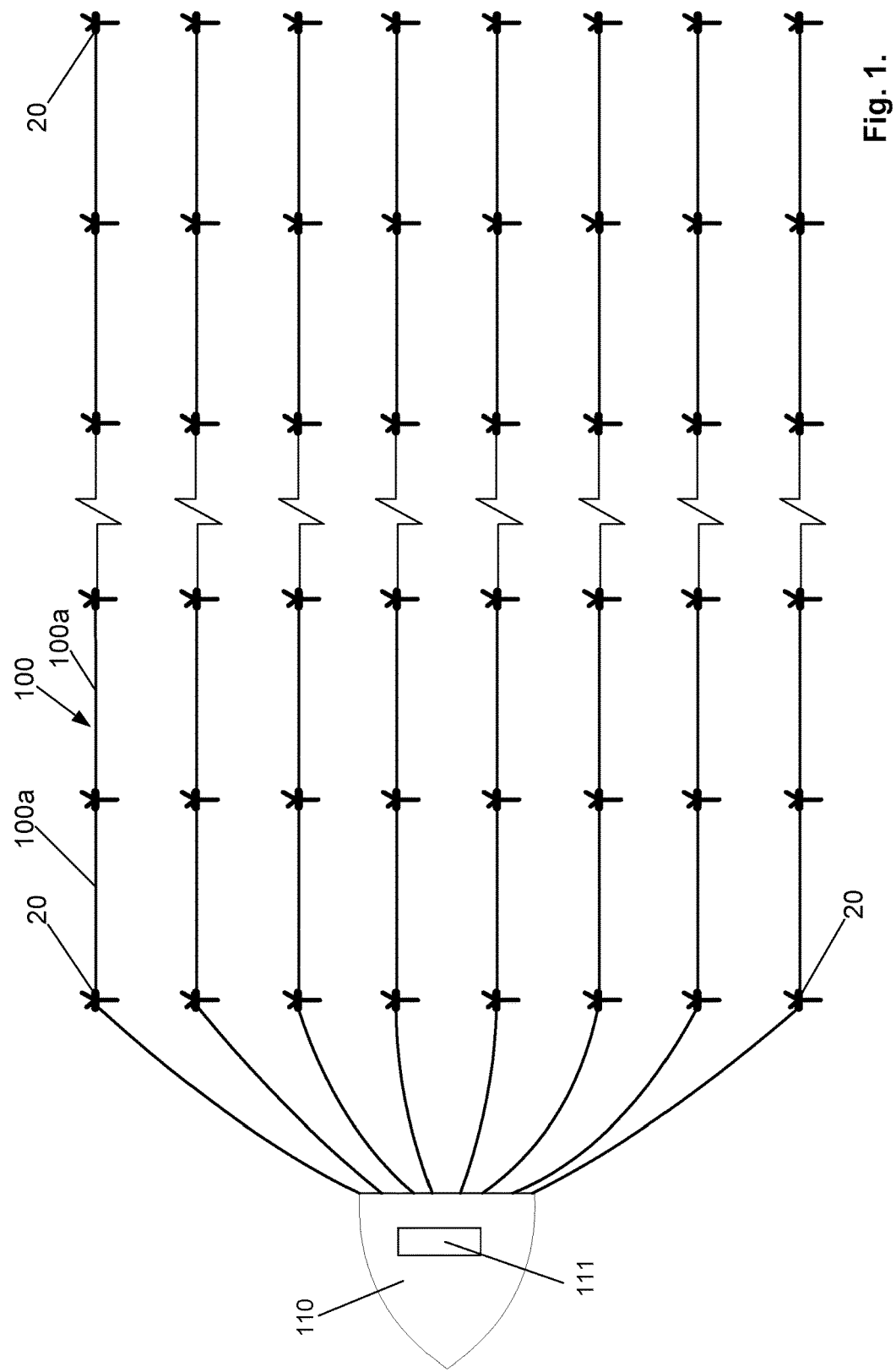
FIG. 1 is a principal drawing of an example of a seismic instrumented cable-spread towed behind a survey vessel.

Reference is now made to FIG. 1 which is a principle drawing of an example of a typical instrumented seismic cable-spread, where seismic instrumented cables 100 are towed behind a survey vessel 110. Each instrumented cable 100 is provided with control devices 20 arranged for connection in series between two adjacent cable sections 100a of a multi-section cable 100, for controlling the instrumented cable 100. At the end of each instrumented cable 100 is arranged a tail buoy (not shown) or a control device 20 provided with a GNSS-unit (not shown). The entire cable-spread is controlled by a control central 111 onboard the vessel 110.

Figure 2:
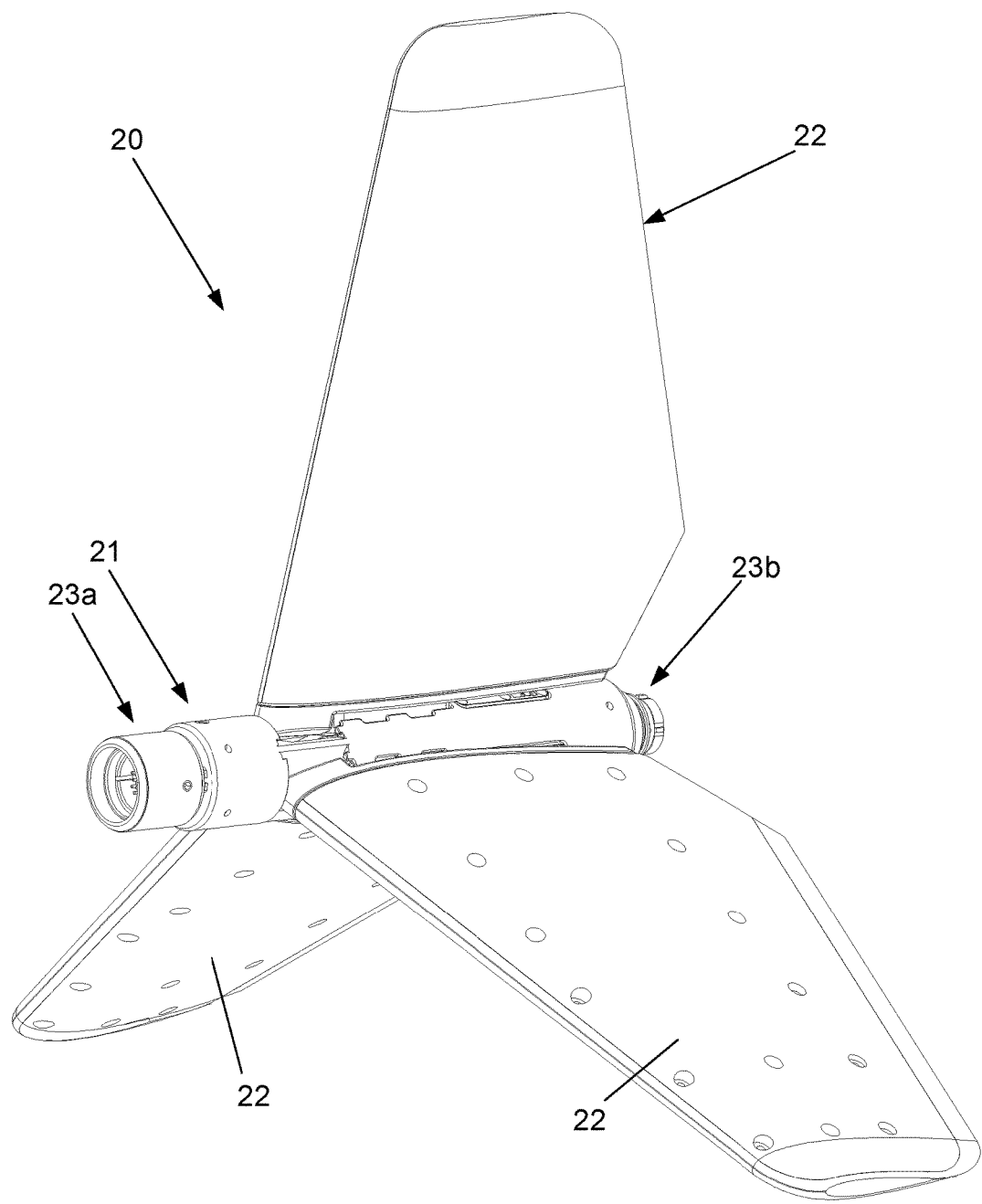
FIG. 2 is a principle drawing of an embodiment of a control device where the wings are provided with sensors and electronics.

Reference is now made to FIG. 2 which is a principle drawing of an example of an embodiment of a control device 20 of prior art.

The control device 20 is formed by a main body 21 and three separate detachable wings 22, preferably so-called smart wings, which are evenly distributed around the main body 21, and is a so-called three-axis bird. The main body 21 is mainly an elongated streamlined tubular housing, which at ends thereof includes connection means 23 and 23b adapted for mechanical and electrical connection in series between cable sections 100a in the instrumented cable 100. The connection means 23a-b are for this adapted corresponding connection points (not shown) at each end of each cable section 100a, which connection points usually are used for connecting two adjacent cable sections 100a. The wings 22 are further separately detachably arranged to the main body 21.

The main body 21 is further provided with a processor unit (not shown), pressure sensor (not shown), and three inductive connections (not shown) for wireless communication and energy transfer to wings 22 or three mechanical connections (not shown) for communication and energy transfer. In addition the main body 21 can further include inertial-cluster (IMU) (not shown) including one or more accelerometers and possibly rate gyro, and possibly velocity sensors for measuring velocity through water.

Figure 3:
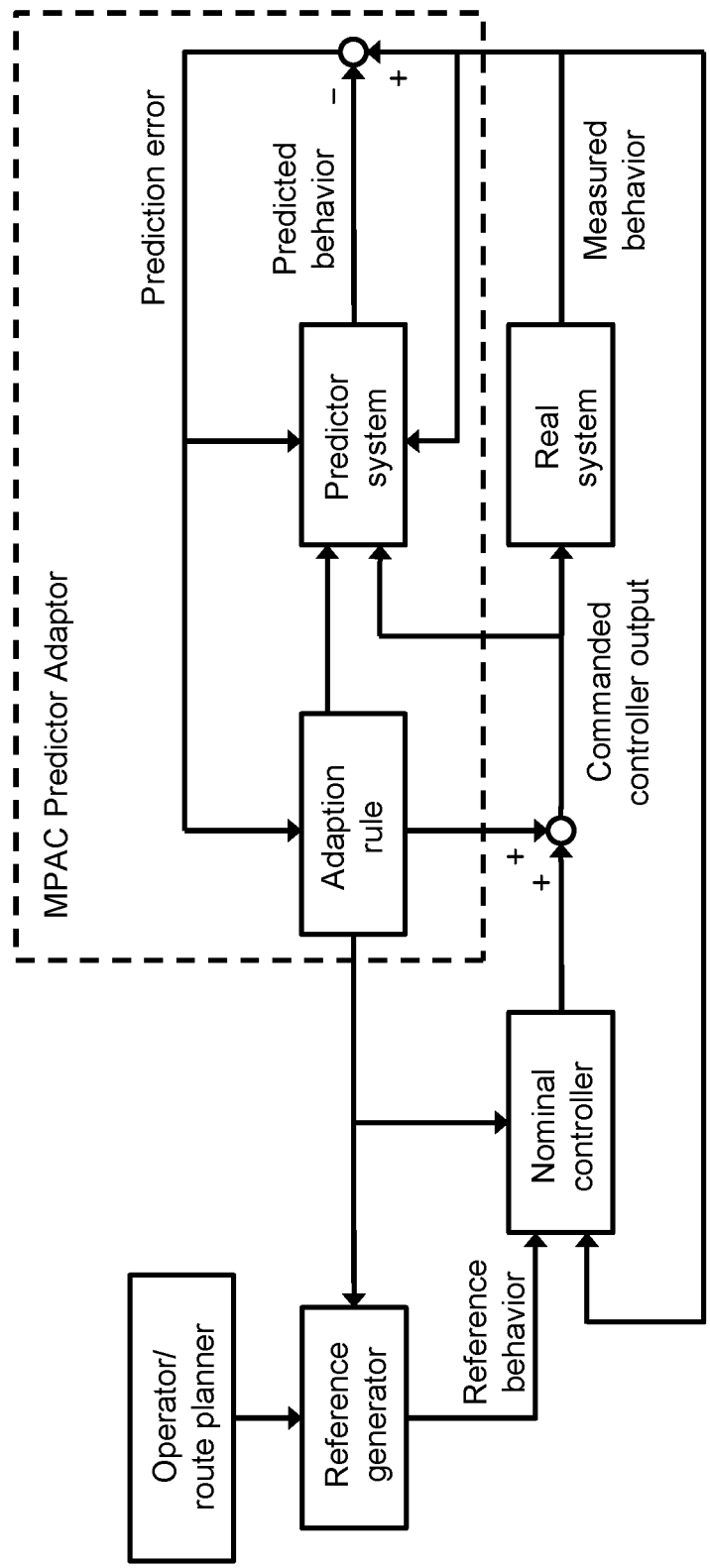
FIG. 3 is a principle drawing of a predictor system.

The wings 22 are provided with a processor unit (not shown), inductive connection (not shown) or mechanical connection (not shown) for connection to the main body 21 for communication and energy transfer, Hall effect sensor (not shown), chargeable buffer batteries 37 (FIG. 3), intelligent charging electronics (not shown), and motor with gear for controlling the wings 22.

Further, a control device 20 like this can, in at least one of the wings 22, be provided with acoustic communication means (not shown) in the form of a transmitter/receiver element, in the form of a transducer, and provided with electronics for acoustic range measurement. In addition or instead of, acoustic transducers can be arranged as a part of the instrumented cable 100 or be arranged in separate nodes.

Control devices 20 like this can further include a GNSS-unit (Global Navigation Satellite System) consisting of a GNSS-antenna and a GNSS-receiver arranged in at least one wing 22 of the control device, where the GNSS-antenna preferably is arranged in the wing tip.

Such control devices 20 can also include a radio unit (not shown) for data transfer consisting of a radio antenna and a radio receiver arranged in at least one wing 22 of the control device, where the radio antenna preferably is arranged along the edge of the wing 22 facing forward, i.e. in the towing direction.

The control device 20 can further include a three-axis magnetometer (not shown) in at least one wing 22 of the control device, which magnetometer preferably is arranged close to the wing tip.

The control device 20 can further be provided with an inertial cluster (IMU) (not shown) including one or more accelerometers and possibly rate gyro, which inertial cluster is arranged in at least one wing 22 of the control device 20.

Figure 4:
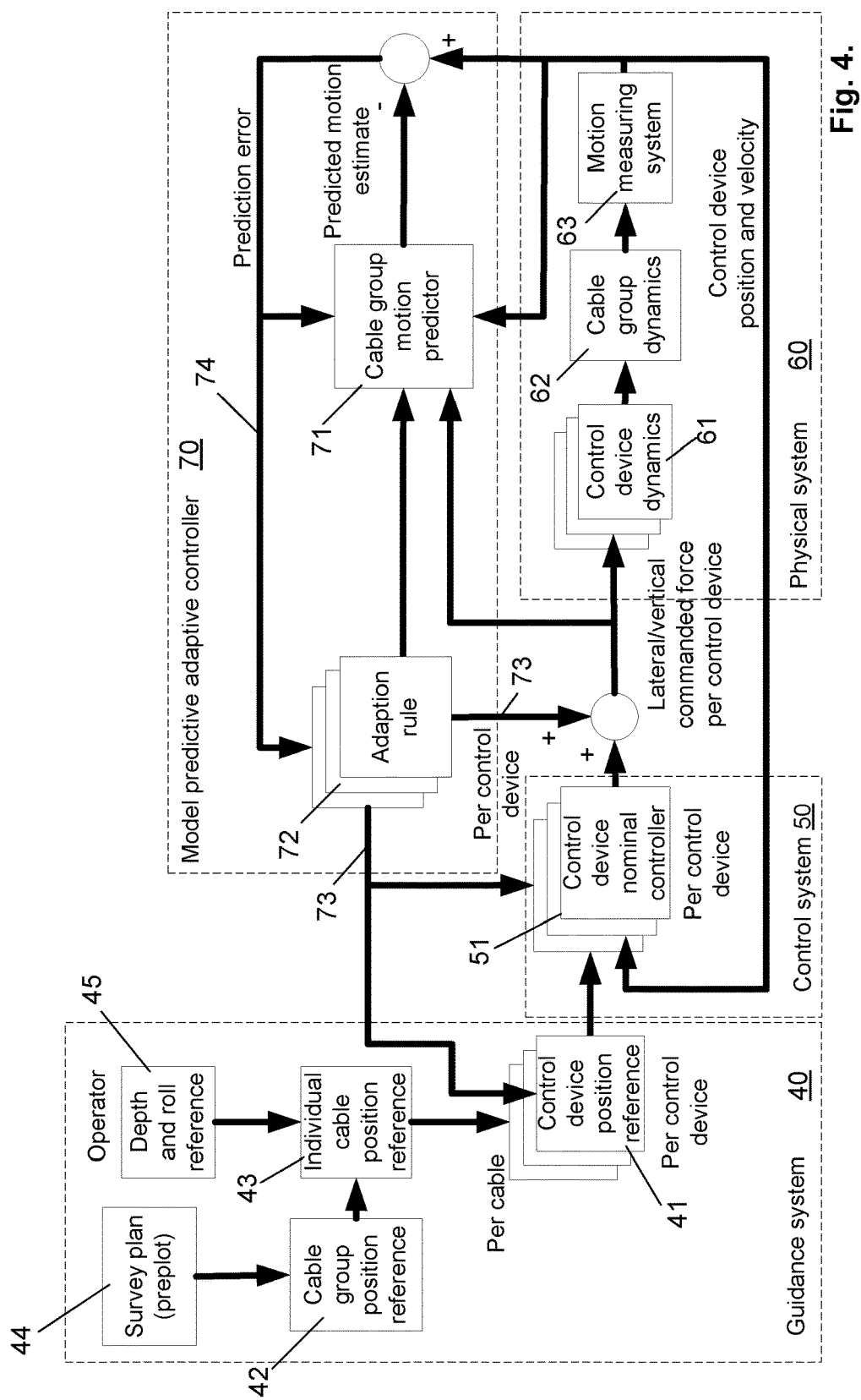
FIG. 4 is a principle drawing for absolute and relative dynamic positioning of marine instrumented cables by the use of model predictive adaptive control.

Reference is now made to FIG. 4 showing a principle drawing for absolute and relative dynamic positioning of marine instrumented cables 100 by the use of model predictive control as described in the general part of the embodiments disclosed above.

For dynamic positioning of marine towed instrumented cables 100 is implemented an adaptive estimate for each control device 20 along the instrumented cables 100.

The system according to the disclosure can be divided in four modules, Guidance system/reference system 40, control system 50, physical system 60 and a model predictive adaptive controller 70. The physical system 60 could typically be represented as shown by dynamics for control device 61, cable group dynamics 62 and a measuring system 63 for motions. The measuring system 63 can include one or more of the following systems or sensors:

acoustics for relative positioning between nodes,
GNSS for absolute position/velocity measurement of nodes,
Inertial sensors and magnetometer for measurement of angular velocities and orientation of nodes.

The control system 50 includes a nominal controller 51 per control device 20 which receives its position reference 41 from a guidance system/reference system 40, e.g. a STAP system, typically arranged in the control central 111 onboard the vessel 110. The nominal controller 51 consists preferably of a model-based feed-forward, and a PD-type feedback.

The guidance system 40 generates position reference 42 for the entire instrumented cable group, and deviated from this, position reference 43 for each instrumented cable 100 and position reference 41 for each control device 20 on each instrumented cable 100. The system further includes a model predictive adaptive controller 70 per control device 20 in the form of a cable group motion predictor 71 and an adaption rule 72 which provides an adaptive estimate 73 and is driven by a prediction error 74 which is calculated by the cable group motion predictor 71, which includes a simulated dynamic prediction model of the total system.

The guidance system/reference system 40, control system 50 and the model predictive adaptive controller 70 are run in one or more software modules on one or more computers/processor units (not shown) on the towing craft 110. The configuration of instrumented cables 100 with control devices 20 and their relative ranges on the instrumented cables 100 are known by all the running software modules.

The reference system/guidance system 40 consists of several blocks as follows: based on a survey plan 44 a position reference 42 is generated for the entire cable group, typically will this reference only be given in the horizontal plane. A survey plan is a plan for which lines/curves on a map a point on the cable group is to traverse. In the plan usually also lies information about depth along the track, preferred towing direction, number of shooting points per surface area along the track, etc. The resulting horizontal position reference 43 for each instrumented cable 100 is generated based on the position reference 42 for the entire cable group. Depth and roll references 45 for each instrumented cable 100 are typically set by an operator dependent of operational conditions, but they can also be very detailed in the survey plan 44, as mentioned above. Depth reference is desired depth for each cable/control device. Roll reference is desired roll angle about longitudinal axis of the instrumented cable. The roll reference is not a necessary parameter for the system to function, but could be used for improving signal/noise ratio of the acoustics. The operator can also override the predefined reference in the horizontal plane dependent of operational conditions. This can be made for an arbitrary number of sections 100a in each instrumented cable 100.

The model predictive adaptive controller 70 contains, as mentioned, a prediction model which is a simulated dynamic model of the entire system consisting of towing craft 110, cable group with control devices 20, and other equipment contributing to the force balance, such as e.g. tail buoys, gun-array and deflector devices (doors). Typical control variable data in the prediction model are commanded thrust and rudder, commanded forces from the control devices 20 along the instrumented cables 100, and measured/estimated forces from the environments as wind, sea current and waves. Wind force and direction are typically measured with a wind meter on the towing craft 110. Waves and wave direction can e.g. be measured by the use of GNSS and inertial sensors on sea buoys, possibly estimated in DP-software. Sea current is also typically estimated in DP-software. The resulting forces from the towing craft 110, control devices 20 and possibly tail buoy, and external disturbances decide the positions in the cable group. Typical measuring data in the prediction model is motion data for the different components in the total system, hereunder position and velocity of the towing craft 110, nodes along the instrumented cables 100 and tail buoys, possibly control devices replacing the tail buoys.

The nominal 51 and model predictive adaptive 70 controllers are dependent of status updates from the respective control devices so that this can be taken into consideration in special circumstances. Wings 22 in saturation or faults in individual wings 22 must be handled specially and could result in limitations in the commanded resultant force per control device 20 for avoiding problems associated with nonlinearities in lifting capability (stalling) of the wings 22.

The guidance system/reference system 40 sets up a position reference 42 for the cable group and generates position reference 43 for each instrumented cable 100 and position reference 41 for each control device 20 along the instrumented cables 100 based on the position reference 43, and depth and possibly roll reference 45. This is input to the nominal controller 51 which controls each respective control device 20 for achieving the mentioned position reference 41 by a power control output which provides a commanded lateral and/or vertical force by adjusting the wings 22 of the control device 20. At the same time the model predictive adaptive controller 70 is used for compensating the power control output from the nominal controller 51 for counter-acting the effects of un-modelled dynamics, insecurity in model parameters, and external forces from the nature or operational equipment affecting the force balance for the instrumented cable(s) 100.

As the model predictive adaptive controller 70 is based on a dynamic prediction model of the total system, and knowledge of power control output from the propulsion means/control means of the towing vessel 110 and possibly also the operational equipment, it is arranged for real-time simulation and prediction of the behavior of the total system. The better knowledge one have about the dynamic model of the total system, the better the nominal controller 51 will work, and the less insecurity the adaptive controller must account for. It will thus be an advantage that the dynamic model is as optimal as possible. The deviation between predicted motion estimate from the cable group motion predictor 71 and motion measurements from the measuring system 63 results in a prediction error 74 driving the adaptive estimate 73, which based on this adjusts the power control output set by the nominal controller 51 for the control devices 20 along the instrumented cables 100, and the prediction error 74 is also used for updating the cable group motion predictor 71.

This results in that one achieves a more rapid response in the control devices 20 when disturbances from the environments changes, at the same time as one avoids jumps in the control elements (motors controlling the wings 22) by sudden changes in position reference for the instrumented cables 100.

By continuous update of the cable group motion predictor 71 one can ensure that this at all time as best as best possible reflects the total system dynamics.

The entire model predictive adaptive control system can also be implemented locally on each control devices 20 instead of a global implementation on the towing craft 110.

The consequence of this is that the local prediction models do not described the interaction between cable sections 100a arranged after one another or between towing craft 110 and each separate instrumented cable 100. It will thus be more model insecurity which must be accounted for in the adaptive estimate. The model predictive controller can also be used in controlling of outer loops, such as e.g. in the guidance system, and also in the measuring system for estimating unknown state variables.

The invention claimed is:

1. A method for dynamic positioning of an instrumented cable (100) towed in water or an array thereof (streamer-array), to which control devices (20) are arranged for controlling the shape and positioning of the individual instrumented cables (100) in relation to other instrumented cables (100) and counteracting crosscurrents or other dynamic forces affecting a cable-array towed behind a seismic survey vessel (110) with a control central (111) for controlling the instrumented cable (100) or cable array, the control central (111) communicating with the instrumented cables (100) and control devices (20), comprising the steps of:
  (a) using a nominal controller (51) for each control device (20) for controlling the instrumented cable (100) based on previous knowledge about the properties of the total system consisting of the vessel (110) with instrumented cables (100) and control devices (20); and
  (b) using a model predictive adaptive controller (70) for each control device (20), the model predictive adaptive controller (70) including a cable group motion predictor (71) for collecting the sum of all model insecurities in a single variable, and an adaption rule (72) providing an adaptive estimate (73) driven by a prediction error (74) given by deviation between predicted motion estimate from the cable group motion predictor (71) and motion measurements from a measuring system (63),
  wherein the adaptive estimate (73) is used for compensating power control output for the control devices (20) along the instrumented cables (100) from the nominal controller (51) for counteracting the effects of un-modelled dynamics, insecurities in model parameters, and external forces affecting the force balance of the instrumented cable (100).

2. The method of claim 1, comprising the step of using the cable group motion predictor (71) for simulating in real-time and predicting behavior of the total system for calculating a predicted motion estimate by using a dynamic prediction model of the total system.

3. The method of claim 2, comprising using information about external forces from the nature or operational equipment affecting the force balance of the instrumented cables (100) for calculating the predicted motion estimate.

4. The method of claim 1, comprising the step of performing measurement selected from one or more of the group consisting of:
  (i) measuring relative position between nodes based on acoustics, and
  (ii) measuring absolute position/velocity of nodes based on Global Navigation Satellite System, and
  (iii) measuring angular velocities and orientation based on inertial sensors and magnetometer for nodes.

5. The method of claim 1, comprising the step of stabilizing the prediction error (74) by feedback in the cable group motion predictor (71).

6. The method of claim 1, comprising the step of using the prediction error (74) for updating the cable group motion predictor (71).

7. The method of claim 1, comprising the step of driving the nominal controller (51) by a position reference (41) for each control device (20), generated from a survey plan (44) or manual settings for depth or roll references (45).

8. A system for dynamic positioning of an instrumented cable (100) towed in water, or an array thereof (streamer-array), to which control devices (20) are arranged for controlling the shape and positioning of the individual instrumented cables (100) in relation to other instrumented cables (100) and counteracting crosscurrents or other dynamic forces affecting a cable-array towed behind a seismic survey vessel (110) with a control central (111) for controlling the instrumented cable (100) or cable array, the control central (111) communicating with the instrumented cables (100) and control devices (20), comprising:
  a nominal controller (51) for each control device (20) for controlling the instrumented cable (100) based on previous knowledge about the properties of the total system consisting of the vessel (110) with instrumented cables (100) and control devices (20);
  a model predictive adaptive controller (70) for each control device (20), which model predictive adaptive controller (70) includes a cable group motion predictor (71) which collects the sum of all model insecurities in a single variable, and an adaption rule (72) which provides an adaptive estimate (73) driven by a prediction error (74) given by deviation between predicted motion estimate from the cable group motion predictor (71) and motion measurements from a measuring system (63),
  wherein the adaptive estimate (73) is used for compensating power control output for the control devices (20) along the instrumented cables (100) from the nominal controller (51) for counteracting the effects of un-modelled dynamics, insecurities in model parameters, and external forces affecting the force balance of the instrumented cable (100).

9. The system of claim 8, wherein the cable group motion predictor (71) includes a dynamic prediction model of the total system arranged for receiving information about external forces from the nature or operational equipment affecting the force balance of the instrumented cables (100), for real-time simulation and prediction of behavior of the total system.

10. The system of claim 8, comprising a measuring system (63) including one or more system or sensor from the group consisting of:
  (i) acoustics for relative position measurement between nodes,
  (ii) Global Navigation Satellite System for absolute position or velocity measurement of nodes, and
  (iii) inertial sensors and magnetometer for measurement of angular velocities and orientation of nodes.

11. The system of claim 8, comprising a guidance or reference system (40) for receiving a survey plan (44) or manual settings for depth or roll references (45), the reference system (40) arranged for generating position reference (42) for cable group, position reference (43) for each instrumented cable (100) and position reference (41) for each control device (20).

12. The system of claim 9, comprising a guidance or reference system (40) for receiving a survey plan (44) or manual settings for depth or roll references (45), the reference system (40) arranged for generating position reference

(42) for cable group, position reference (43) for each instrumented cable (100) and position reference (41) for each control device (20).

13. The system of claim 10, comprising a guidance or reference system (40) for receiving a survey plan (44) or manual settings for depth or roll references (45), the reference system (40) arranged for generating position reference (42) for cable group, position reference (43) for each instrumented cable (100) and position reference (41) for each control device (20).

14. The system of claim 8, wherein the nominal controller (51) is driven by the position reference (41) for each control device (20).

15. The system of claim 9, wherein the nominal controller (51) is driven by the position reference (41) for each control device (20).

16. The system of claim 10, wherein the nominal controller (51) is driven by the position reference (41) for each control device (20).

17. The method of claim 2, comprising using information about external forces from the nature or operational equipment affecting the force balance of the instrumented cables (100).

* * * * *